United States Patent [19]

Hall

[11] 3,761,711

[45] Sept. 25, 1973

[54] IMPROVED GERMANIUM GAMMA DETECTORS HAVING NON-IDEAL CONTACTS AND DEEP LEVEL INDUCING IMPURITIES THEREIN

[75] Inventor: Robert N. Hall, Schenectady, N.Y.

[73] Assignee: General Electric Company, Schenectady, N.Y.

[22] Filed: Feb. 25, 1972

[21] Appl. No.: 229,490

[52] U.S. Cl. .......................... 250/370; 317/235 N

[51] Int. Cl. .............................................. G01t 1/24

[58] Field of Search .................... 250/83; 317/235 N

[56] References Cited

UNITED STATES PATENTS

| | | | |
|---|---|---|---|
| 3,527,944 | 9/1970 | Kraner | 250/83 R |
| 3,612,869 | 10/1971 | Baum et al. | 250/83 R |
| 3,598,997 | 8/1971 | Baertsch | 250/83 R |

*Primary Examiner*—Archie R. Borchelt
*Attorney*—John F. Ahern et al.

[57] ABSTRACT

Improved gamma detectors utilize a nonideal N+ or P+ electrode to provide restricted leakage curent and doping with deep level donor or acceptor-inducing impurities to provide apparent near-intrinsic characteristic and maintain wide depletion regions therein.

10 Claims, 1 Drawing Figure

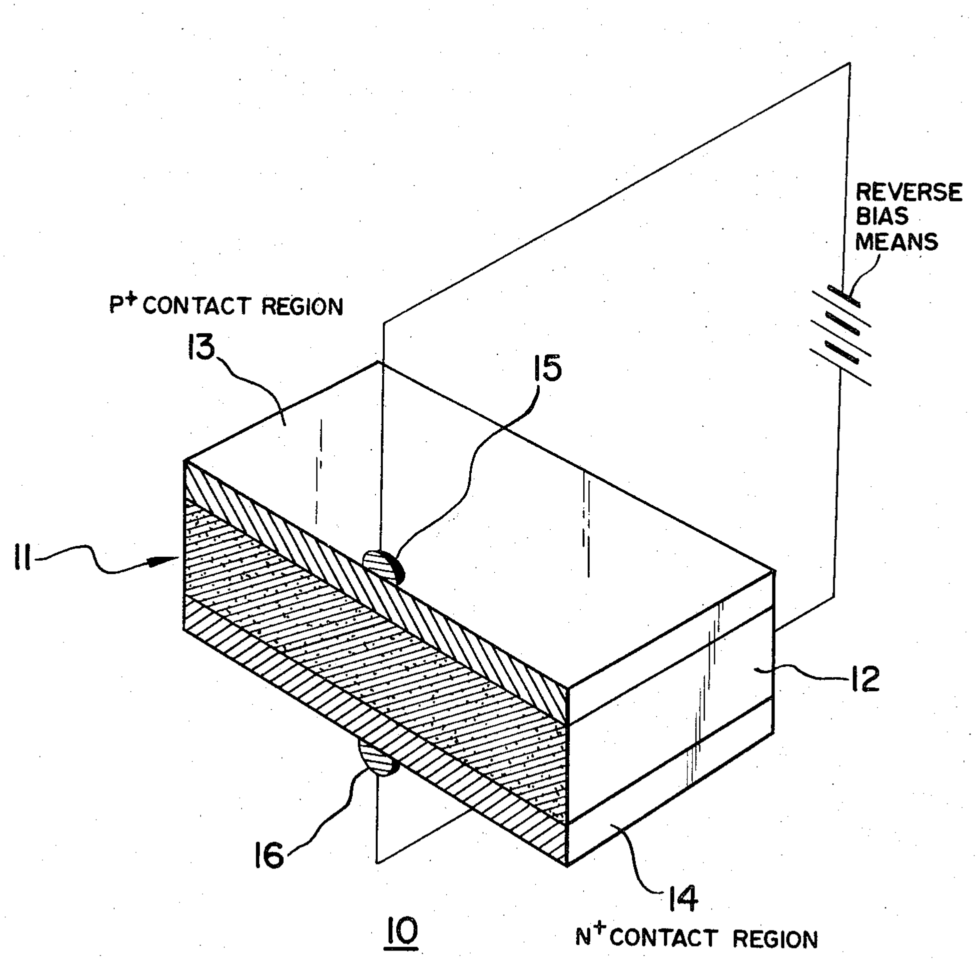
REVERSE
BIAS
MEANS
P+ CONTACT REGION
13
15
11
12
16
14
10
N+ CONTACT REGION

IMPROVED GERMANIUM GAMMA DETECTORS HAVING NON-IDEAL CONTACTS AND DEEP LEVEL INDUCING IMPURITIES THEREIN

The present application is directed to improved gamma detectors. More particularly, the present invention is directed to improved gamma detectors for operation at temperatures of substantially 77°K wherein an increase in effective purity is obtained by utilizing very high purity germanium containing residual impurities and adding thereto a small quantity of a preselected material giving rise to appropriate deep levels.

Gamma ray detectors are, in essence, a body of exceedingly high purity material as, for example, germanium, wherein a thick depletion region may be established by high reverse bias so as to be exceedingly sensitive to the passage of a small quantity of high energy particles therethrough. Basically, such devices include, for example, a body of germanium having a relatively thick intrinsic, or near intrinsic, region with a donor or N+ surface-adjacent region on one major surface thereof and an acceptor or P+ region on the opposite major surface thereof.

Most recent development in the preparation of gamma detectors of this type has been toward the processing of germanium in order to obtain the highest purity and the greatest freedom from charged impurity states in the near intrinsic region between the donor and acceptor surface-adjacent regions. Thus, for example, processing techniques directed for the elimination of residual acceptor activities and a minimizing of the residual donor activities have been disclosed and claimed in my application Ser. No. 772,044, filed Oct. 30, 1968, U.S. Pat. No. 3,573,108, and my co-pending application Ser. No. 82,788 filed Oct. 21, 1970 and assigned to the present assignee and incorporated herein by reference thereto.

As used herein, the terms "donor" and "acceptor" are used to identify conventional donors of Gr V and conventional acceptors of Gr III of the periodic table. Such impurities add substitutional states to the germanium and induce shallow energy levels very close to the conduction and valence band edges. Additionally, the interstitial impurity lithium is classed herein as a donor impurity.

While the state of the art as evidenced by purification processes, such as described in my patent and the aforementioned application, have made it possible to obtain germanium having a high purity, as evidenced by a freedom from all but about approximately the order of $10^{10}$ donors or acceptors/cm$^3$ thereof, for the provision of exceptionally useful gamma detectors, a purity, as evidenced by the freedom from excess donors or acceptors of the order of $10^8$/cm$^3$, is desirable.

The foregoing objective does not appear to be readily achievable by chemical purification or physical manipulation as is done in my prior inventions. It appears that electrical compensation of the residual donors is necessary. While the prior art has sought to achieve exceedingly high simulated purities and a concentration of low excess uncompensated impurities by compensation and introduction of trapping levels, such attempts have not been reliably reproducible. To the extent that such attempts have been successful, success has generally been achieved in the provision of such a state under equilibrium conditions in which high field conditions are not present. In the case of the operation of a gamma detector, however, operation under a high reverse bias causing high field conditions and the establishment of a thick depletion region are essential.

Accordingly, it is an object of the present invention to provide improved gamma ray detectors for low temperature (the order of 77°K) operation.

Another object of the invention is to provide germanium gamma ray detectors having an effective uncompensated impurity concentration of the order of $10^8$/cm$^3$ thereof at such low temperatures.

Still another object of the invention is to provide germanium gamma ray detectors wherein the presence of appropriate impurity additives which induce deep levels simulates heretofore unobtainable purity.

The novel features characteristic of the present invention are set forth in the appended claims. The invention itself, together with further objects and advantages thereof may best be understood by reference to the following detailed description taken in connection with the appended drawing in which the sole FIGURE is a vertical, cross-sectional perspective view of a typical gamma ray detector in accord with the present invention.

In the FIGURE, a gamma ray detector represented generally at 10 includes a body of germanium 11 having a substantially intrinsic region 12 which is bonded at one major surface thereof by an acceptor or P+ region 13 and at the other major surface thereof by a donor or N+ region 14. Electrical contact may conveniently be made to both P+ and N+ type regions by means of bonded indium dots 15 and 16, respectively.

The germanium constituting the intrinsic region 12 is high purity, such as is the best obtainable in the art and may conveniently be the end product of the process described in my aforementioned application Ser. No. 82,788. Such material may have a concentration of residual donors or acceptors of the order of $10^{10}$/cm$^3$. To this material is added, in accord with the present invention, an appropriate deep level inducing material, as will be described hereinafter.

Acceptor or P+ region 13 may be an evaporated metallic layer producing a Schottky-type injecting barrier. Alternatively, an acceptor such as boron may be diffused or otherwise implanted uniformly into an approximately 0.1 to 1 micron thickness surface-adjacent region of the wafer 11, as by ion bombardment, liquid epitaxy, or thermal diffusion thereof. N+ region 14 may be provided conveniently by the application of a slurry of a lithium compound and the heating thereof, as is well known to the art to cause a diffused layer containing lithium in a thin 0.1 to 1.0 millimeter adjacent region thereof. Alternatively, lithium or an appropriate donor material may be electrolytically deposited thereover and subsequently diffused to produce an N+ layer having a thickness of approximately 0.2 mm. The total thickness of the device may be approximately a few centimeters, for example 2 cm. Indium pads or dots 15 and 16 for contact purposes may be of the order of approximately 1.0 mm in diameter and provide good electrical contact to the P+ and N+ regions, respectively.

As is mentioned hereinbefore, a germanium gamma detector basically consists of a substantially intrinsic, thick region of germanium having a high purity with a low concentration of uncompensated donors or acceptors of the order of $10^{10}$/cm$^3$ thereof, or advantageously even fewer. As used herein, the term "intrinsic" connotes an essentially pure germanium body with very high resistive or insulating characteristics at low temperatures. The term "substantially intrinsic" is used to connote a body in which charged impurity states are present, but are compensated or neutralized so that a high resistivity, simulating intrinsic resistivity may be obtained. This region is bounded on opposite respective sides by an N+ electron injecting region and a P+ hole injecting region. Upon the application of a reverse bias thereto, if the contacts and the intrinsic regions are ideal, namely, if they perform only as they would under perfect condition with no perturbation, a thick depletion region is established within the semiconductor body and the passage of gamma rays therethrough is indicated by an electrical pulse in the output circuit connected between the respective opposite contacts.

In addition to the difficulty of obtaining and maintaining a low impurity concentration, a detriment to successful operation of prior art gamma detectors is the operation of nonideal N+ and P+ contact regions.

In accord with the present invention, I utilize the nonideal characteristics of N+ and P+ contact regions together with appropriate doping with deep level impurities to obtain a simulated near-intrinsic germanium at low temperature having an apparent net volume space charge density of the order of $10^8/cm^3$ under applied field conditions. As is used herein, a deep level impurity is meant to connote one which when added to the semiconductor produces at least one deep donor or acceptor level substantially close to the middle of the energy gap in the energy level diagram of the semiconductor. These deep levels may be donors or acceptors. Most of the known deep-level impurities are acceptors so that if they are initially in a neutral state, they are then adaptable to capture an electron and assume a negative charge. Similarly, deep level donors, if present, may be either neutral or in the state depleted of their electrons and thus having a positive charge so that they are then able to capture an electron. It is this property of deep levels that is utilized in connection with the use of nonideal P+ and N+ contacts to obtain improved gamma detector operation. By virtue of the mechanism whose novel features are described below, the application of a high field in the reverse direction across the detector diode causes the space charge density within the semiconductor body to approach zero, resulting in a wide depletion region which is ideal for gamma detection.

Normally, the P+ and N+ contact regions of a gamma detector should be as nearly ideal as possible, since nonideality means that free carriers are generated thereat and give rise to a leakage current which normally degrades the performance of the detector. In accord with the present invention, however, either the N+ or the P+ contact is deliberately caused to be slightly removed from ideal characteristics and a small leakage current is utilized. This deviation from ideal characteristics may be obtained by the use of a Schottky barrier having a relatively low barrier height, such barriers being well known to those skilled in the art, or by the use of ion-implanted N+ or P+ regions which have defects thereat which tend to cause a departure from ideal characteristics. As is well known, such barriers formed on germanium that is free of deep-level impurities exhibit very low leakage currents at low applied voltages, but if the voltage is increased beyond a critical threshold value, the leakage current increases very rapidly with further voltage increase, as a consequence of the increased electric field strength in the germanium adjoining the barrier. However, in accord with the present invention, the deep level impurities which were selectively added are chosen to be such that they capture some of the electrical charges which comprise the leakage current, thereby reducing the space charge density within the substantially intrinsic germanium, and increasing the depletion layer thickness. As a consequence of the increase in depletion layer thickness, the electric field strength in the germanium adjoining the barrier is prevented from increasing significantly with increase in applied voltage, and accordingly the leakage current is not caused to increase beyond a small threshold value as defined below. Numerous ways for producing nonideal contacts are well known in the art. The leakage currents which are tolerable in operation of devices in accord with the present invention are such as not to significantly decrease the resolution of the detector but only sufficiently enough to cause the deep level impurities added to the semiconductor body to change their charge state and force the space charge to be reduced to approach zero under the nonideal electrode region. Such reduction in space charge is accompanied by corresponding increase in the depletion layer thickness under the electrode. A suitable leakage current is a maximum of approximately $10^{-10}$/amperes per square centimeter. The deviation from ideal characteristics of the acceptor and donor contacts for the devices in accord with the present invention are chosen so as to have a characteristic such that a threshold for maximum leakage current exists at approximately a space charge thickness of 2 centimeters with an applied voltage of 500 volts. This maximum tolerable leakage current will be referred to herein as the threshold current.

In preparation of devices in accord with the present invention, conventional techniques are followed to prepare the germanium as, for example, an iron-doped germanium body may be prepared by the mixing of a charge of 500 grams of highly-purified germanium which, if melted and grown into a monocrystalline ingot, would result in the presence of germanium having a concentration of approximately $1 \times 10^{10}/cm^3$ of uncompensated donor impurities therein together with approximately 190 micrograms of high-purity iron calculated to provide approximately $2 \times 10^{10}/cm^3$ of iron atoms in the first grown portion of the crystal as calculated from its distribution coefficient. A monocrystalline wafer is cut from the iron-doped ingot with a thickness of approximately 2 centimeters and a diameter of, for example, 5 centimeters, N+ and P+ contact regions are made thereto, as, for example, by forming a Schottky barrier on one surface with a work function such as to tolerate a leakage current of approximately $1 \times 10^{-10}$ $A/cm^2$ at an applied voltage of 500 volts, as is described hereinbefore, and a boron ion-implanted P+ region on the opposite surface.

As is well known in the art, and as is, for example, taught by Sze and Irvin in Solid State Electronics, Vol. 11, page 559 (1968) iron induces in germanium deep acceptors at 0.27 electronvolts below the conduction band and 0.35 electronvolts above the valence band. Iron is therefore suitable to be added to the germanium in accord with the invention.

Such a germanium body, having an excess of positive space charge due to conventional donors of a concentration of $N_D$ of the order of $10^{10}/cm^3$ may have a nonideal P+ contact which tends to inject electrons instead of positive holes into the body, thus causing the buildup of a negative space charge under the P+ electrode region. In the absence of this electron current, the iron atoms in the depletion region would be substantially all in their neutral state by virtue of their higher probability for emitting electrons into the conduction band as compared with that for emitting holes into the valence band. Under these conditions, when the bias voltage across the detector is raised above the aforementioned critical value, causing a maximum tolerable leakage current with the injection of electrons from the nonideal P+ contact, the electrons which are generated are captured at the deep level acceptor sites which become negatively charged thereby neutralizing part of the space charge and reducing it toward zero and increasing or widening the depletion region. With the widening of the space-charge region, further bias voltage may be applied and the cycle of electron injection and electron capture is continued. In order that this condition exist, however, it is necessary not only that the aforementioned probability relationship with the deep acceptors exist, but also that the number of deep acceptor states within the semiconductor be greater than the number of shallow donor states, resulting in the net space charge at low and high fields, respectively, being of values of $+eN_D$ and $-e(N_{DA}-N_D)$, respectively.

If on the other hand, the germanium from which the detector is fabricated has a P-type residual conduction characteristic, as evidenced by an excess of shallow acceptors of quantity $N_A$, and again assuming a nonideal P+ contact, the invention is capable of being applied to achieve the same results by the addition of a deep donor level-inducing impurity, as for example, selenium which induces a deep donor level into the germanium band structure. In such a device, the germanium is prepared as above by the addition of a concentration of selenium atoms greater than the concentration of excess shallow acceptor impurities. In operation, the deep donor level is located slightly above the middle of the energy gap and has a greater probability for the emission of an electron to the conduction band than for the capture of an electron from the valence band, and therefore in the presence of a strong electric field it exists in a positively charged state. As with the previous case, with a nonideal P+ contact, upon the application of a reverse bias approaching the threshold value, the P+ contact emits electrons into the germanium body. These electrons are captured by the deep selenium donor sites, driving the space charge towards zero and reestablishing a thick depletion layer for ideal gamma detector operation. Again, the necessary criteria are the probability relationship stated above and the requirement that the concentration of deep donor atoms, $N_{DD}$ be greater than the concentration of residual shallow acceptors $N_A$. Under these conditions, the net maximum space charge at low and high fields becomes $+e(N_{DD}-N_A)$ and $-eN_A$, respectively.

Should the nonideal contact in the gamma detector be the N+ electrode so that, upon reaching the threshold value under high reverse bias, commence to inject positive holes into the germanium, there are two correlative conditions to those expressed above, namely, the germanium may initially be residual N-type with a concentration $N_D$ of residual shallow donor sites or it may be residually P-type with a concentration $N_A$ of residual shallow acceptor impurities therein. In the case of the residual acceptor concentration, a concentration of deep donor levels is caused to exist in the semiconductor body. In this instance, the concentration of the material used to induce the deep donor levels $N_{DD}$ must be greater than the concentration of excess shallow acceptor impurity inducing atoms $N_A$. In this case, the net maximum space charges at low and high field conditions are $-eN_A$ and $+e(N_{DD}-N_A)$, respectively.

When at the threshold value, the nonideal N+ contact begins to inject holes, the deep donor levels which are normally neutral and which upon capturing a positive hole injected from the N+ contact become positively charged and tend to drive the space charge toward zero and reestablish a thick depletion region.

In the final case, assuming a residual concentration of shallow donor activator impurities in the germanium body of a concentration $N_D$, the operation of devices in accord with the invention to provide the simulated high purity corresponding to an apparent presence of $10^8$ impurities per cubic centimeter may be attained by adding a material such as nickel, or cobalt, all of which induce deep acceptor sites of a concentration $N_{DA}$ near the center of the energy band gap of germanium and which are normally negatively charged and are effective to trap injected positive holes from the imperfect N+ contact region when the leakage current passes the threshold point and becomes neutral and tend to cause the space charge to approach zero, thus permitting the maintenance of a thick depletion region. In this case, the net maximum space charges for low and high field conditions are $-e(N_{DA}-N_D)$ and $+eN_D$, respectively.

The amounts of the impurity added, in each of the foregoing situations, to the germanium prior to growth of the ingot from which the wafer of which the detector is made is determined in accord with the segregation coefficient of the deep level inducing impurity in germanium and in accord with the purity of the germanium to which it is added and the apparent concentration of residual donors or acceptors which are desired in the final wafer from which the detector is fabricated, as is set forth hereinbefore with respect to the first case, and which calculations are well known to those skilled in the art.

As is described hereinbefore, we are concerned only with the impurities which add deep levels and preferably those which are near the center of the forbidden band between the valence and the conduction bands, as additives.

Among the materials useful in practicing my invention, iron has two acceptor sites which are 0.27 electronvolts below the conduction band and 0.35 electronvolts above the valence band, respectively. Nickel has two deep acceptor sites 0.30 electronvolts below the conduction band and 0.23 electronvolts above the valence band, respectively. Cobalt has two deep acceptor levels, namely, 0.30 electronvolts below the conduction band and 0.25 electronvolts above the valence band respectively. Selenium possesses two deep donor sites at 0.14 and 0.28 electronvolts below the conduction band.

I am aware that doping with materials having deep levels in germanium for trapping purposes, even in radiation detectors, has been attempted before, but not successfully. Such doping has been attempted with gold which has a plurality of donor and acceptor sites which are relatively shallow. Note that deep level doping has been used successfully in the past for other purposes, for example, for high sensitivity photoconductors and infrared radiation detectors, but not for nuclear particle detectors such as gamma ray detectors.

As for Au, it is not satisfactory in this environment for the following reasons: The singly charged levels (0.05 donor and 0.15 acceptor) are both too close to the valence band and would not, therefore, retain a captured hole long enough to be useful, except at much lower temperatures than 77°K. The upper two levels are multiply charged and would therefore not be suitable for this application.

Devices prepared in accord with the present invention are such as is illustrated in FIG. 1. A typical preparation for the germanium is as is set forth in my copending application Ser. No. 82,788. In order to add the impurity dopant, a charge of, for example, 550 grams of purified germanium having a concentration which would result in a presence of approximately $1 \times 10^{10}/cm^3$ N-type residual donors therein if grown without any addition, is placed in the final crucible together with 190 micrograms of high-purity iron, calculated to produce $2 \times 10^{10}/cm^3$ of iron atoms at the upper end of the crystal, as calculated from its distribution coefficient. The resultant crystal has the impurity levels of iron described hereinbefore established in the germanium and when assembled in a detector according to the invention with a non-ideal P+ contact and applied operating voltage, exhibits an apparent (due to compensation) concentration of excess donors of the order of $5 \times 10^8/cm^3$ at 77°K.

While the invention has been set forth herein with respect to specific embodiments in certain features thereof, many modifications and changes will occur to those skilled in the art. Accordingly, by the appended claims, I intend to cover all such modifications and changes as fall within the true spirit and scope of the disclosure.

I claim:

1. A gamma detector comprising:

a. a monocrystalline wafer of high purity germanium containing a minor but finite quantity of a material which induces in the energy band structure of the germanium at least one deep trapping level substantially close to the middle of the energy gap in the energy level diagram thereof for conduction carriers sufficient to maintain a wide depletion region therein under conditions of high reverse bias;

b. a donor or electron injection contact region bounding one major surface of said wafer;

c. an acceptor or hole-injecting contact region bounding the remaining major surface of said wafer, and d. means for applying an operational reverse bias voltage between said regions, e. one of said contact regions being nonideal so as to inject opposite sign carriers into said germanium body under high reverse bias and to establish a leakage current therein.

2. The detector of claim 1 wherein said deep levels are acceptor levels and said body has a residual concentration of shallow donor levels $N_D$.

3. The detector of claim 1 wherein said deep levels are donor levels and said body has a residual concentration of shallow acceptor levels $N_A$.

4. The detector of claim 1 wherein said one deep level is at least as great as 0.20 *e*V below the conduction band or 0.20 *e*V above the valance band of the germanium energy level structure.

5. The detector of claim 4 wherein the deep level inducing material is a transition metal.

6. The detector of claim 4 wherein the deep level inducing material is selected from the group consisting of manganese, iron, nickel, and cobalt.

7. The device of claim 1 wherein the apparent purity of the germanium wafer due to the induced trapping levels is of the order of $10^8$ free conduction carriers per cubic centimeter thereof at a temperature of approximately 77°K with reverse bias voltage applied.

8. The device of claim 1 wherein the concentration of deep level inducing impurity atoms in said germanium exceeds the concentration of uncompensated shallow level inducing impurities therein and is of opposite conductivity inducing type therefrom.

9. The device of claim 8 wherein the residual uncompensated impurities are donors in the concentration $N_D$ and the relationship of the concentration of deep level inducing atoms $N_{DA}$ is such that $N_{DA} > N_D$.

10. The device of claim 9 wherein said deep level impurity sites take on a charge state in the presence of an applied electric field, as a consequence of their relative probability for emitting electrons and holes, such that they are able to capture the type of charge carrier being generated by the nonideal contact.

* * * * *